United States Patent
Rog et al.

(10) Patent No.: US 8,668,431 B2
(45) Date of Patent: Mar. 11, 2014

(54) SEAL CLEARANCE CONTROL ON NON-COWLED GAS TURBINE ENGINES

(75) Inventors: Daniel T. Rog, South Windsor, CT (US); Ronald T. Clawson, Ellington, CT (US)

(73) Assignee: United Technologies Corporation, Hartford, CT (US)

(*) Notice: Subject to any disclaimer, the term of this patent is extended or adjusted under 35 U.S.C. 154(b) by 867 days.

(21) Appl. No.: 12/748,791

(22) Filed: Mar. 29, 2010

(65) Prior Publication Data
US 2011/0236179 A1    Sep. 29, 2011

(51) Int. Cl.
*F01D 11/24*    (2006.01)

(52) U.S. Cl.
USPC ............................................... 415/1; 415/139

(58) Field of Classification Search
USPC .............. 415/134, 136, 139, 144, 145, 178, 1
See application file for complete search history.

(56) References Cited

U.S. PATENT DOCUMENTS

| | | | |
|---|---|---|---|
| 3,583,824 A | 6/1971 | Smuland et al. | |
| 3,742,705 A * | 7/1973 | Sifford | 60/806 |
| 3,970,319 A * | 7/1976 | Carroll et al. | 277/414 |
| 4,019,320 A | 4/1977 | Redinger, Jr. et al. | |
| 4,069,662 A | 1/1978 | Redinger, Jr. et al. | |
| 4,213,296 A | 7/1980 | Schwarz | |
| 4,257,222 A | 3/1981 | Schwarz | |
| 4,441,314 A | 4/1984 | Fitton | |
| 4,513,567 A * | 4/1985 | Deveau et al. | 60/782 |
| 4,662,820 A * | 5/1987 | Sasada et al. | 415/173.6 |
| 4,804,310 A * | 2/1989 | Fuller et al. | 415/115 |
| 4,921,401 A * | 5/1990 | Hall et al. | 415/138 |
| 4,928,240 A * | 5/1990 | Davison et al. | 701/100 |
| 6,863,495 B2 * | 3/2005 | Halliwell et al. | 415/173.1 |
| 7,070,387 B2 * | 7/2006 | Crozet et al. | 415/173.1 |
| 7,785,063 B2 * | 8/2010 | McQuiggan et al. | 415/1 |
| 7,823,389 B2 * | 11/2010 | Seitzer et al. | 60/782 |
| 2006/0110248 A1 * | 5/2006 | Nelson et al. | 415/173.4 |
| 2010/0139288 A1 * | 6/2010 | Rago | 60/785 |
| 2011/0027068 A1 * | 2/2011 | Floyd et al. | 415/13 |

\* cited by examiner

*Primary Examiner* — Edward Look
*Assistant Examiner* — Liam McDowell
(74) *Attorney, Agent, or Firm* — Miller, Matthias & Hull LLP

(57) ABSTRACT

A method for controlling turbine blade tip seal clearance on a non-cowled gas turbine engine includes the step of directing a flow of relatively hot, pressurized air in contact with an exterior surface of the engine core casing circumscribing the turbine. The flow of relatively hot, pressurized air may be selectively directed in contact with the exterior surface of the engine core casing circumscribing the turbine when it is desired to expand the turbine shroud radially outward, such as during transient operation of the gas turbine engine.

11 Claims, 2 Drawing Sheets

SEAL CLEARANCE CONTROL ON NON-COWLED GAS TURBINE ENGINES

FIELD OF THE INVENTION

This invention relates generally to gas turbine engines and, more particularly, to control of blade tip seal clearance in the turbine of a non-cowled gas turbine engine during transient operating conditions.

BACKGROUND OF THE INVENTION

Gas turbine engines include a turbine disposed aft of a combustor for extracting energy from the hot, high velocity combustion gases passing from the combustor. The turbine includes a plurality of rotor stages attached to a rotatable shaft for driving a compressor for delivering pressurized air to the combustor. Each rotor stage includes a plurality of turbine blades that extend outwardly from a rotor disk. The outboard tips of the turbine blades terminate in close proximity to a facing seal carried on a stationary stator shroud circumscribing the turbine rotor assembly.

Maintaining a minimal clearance between the tips of the turbine blades and the facing surface of the seal over the entire operating range of the gas turbine engine is desirable to minimize leakage of combustion gases past the turbine blades. Excessive leakage results in a decrease in turbine performance, causing specific fuel consumption to increase and power output to decrease. However, the rotating blades of the turbine are subject to differential expansion and contraction relative to the stationary stator shroud, on which the tip seals are carried, over the operating range of the engine as the temperature and mass flow of the combustion gases passing through the turbine fluctuates amongst steady state operation at cruise, and transient conditions during rapid acceleration at low power operation, such as idle and taxi, or at high power operation, such as take-off, climb and high-speed maneuvers.

It is customary practice during operation of high bypass turbofan gas turbine engines on large commercial aircraft to control turbine blade tip seal clearance by selectively cooling the outboard surface of the turbine case shell during transient conditions in which expansion of the turbine rotor assembly is expected. In high bypass turbofan gas turbine engines, a fan air duct is defined between a relatively large diameter outer fan cowl and an inner fan cowl disposed radially inboard of the outer fan cowl. The inner fan cowl circumscribes the engine core casing and establishes a cavity about the engine core casing that is isolated from the relatively cold air stream passing through the fan air duct. Thus, the engine core casing, which includes a section circumscribing the turbine, is bounded by a relatively warm, low pressure, dead air cavity. Control of turbine blade tip seal clearance is typically achieved in such high bypass turbofan gas turbine aircraft engines by selectively cooling the exterior surface of the engine core casing circumscribing the turbine when it is desired to cause the section of the engine core casing circumscribing the turbine to shrink, such as during steady-state operation, thereby causing the seals facing the tips of the rotating turbine blades to move inboard to lie in closer proximity to the turbine blade tips. Typically, the cooling air is drawn from the fan air stream.

However, smaller commercial and non-commercial aircraft are commonly equipped with non-cowled gas turbine engines, such as moderate and low bypass turbofan gas turbine engines. Typically, on moderate and low bypass gas turbine engines, there is no inner fan cowl isolating the engine core casing from the fan air stream. Rather, the section of the engine core casing circumscribing the turbine is directly exposed to the relatively cold fan air stream passing through the fan duct. Consequently, it is generally not necessary to selectively cool the turbine case shell during steady-state operation of a non-cowled gas turbine engine. However, during transient operations such as take-off, climb or other rapid engine acceleration event, there exists a risk of the turbine blades expanding and contacting the tip seals carried on the turbine shroud, which is supported from the section of the engine core casing circumscribing the turbine, because the turbine shroud remains relatively cooler than the turbine blades due to the engine core casing being in direct contact with the relatively cold fan air stream.

Therefore, it would be desirable to provide a method and system for controlling seal clearance between the turbine blades and the blade tip seals during periods of transient operation of a gas turbine engine on a non-cowled gas turbine engine.

SUMMARY OF THE INVENTION

A method is provided for controlling turbine blade tip seal clearance on a non-cowled gas turbine engine having a compressor, a turbine and an engine core casing. The turbine has a plurality of turbine blades circumscribed by a turbine shroud supporting a plurality of seals in juxtaposition with the tips of the plurality of turbine blades. The method of controlling turbine blade tip seal clearance includes the step of directing a flow of relatively hot, pressurized air in contact with an exterior surface of the engine core casing circumscribing the turbine. The step of directing a flow of relatively hot, pressurized air in contact with an exterior surface of the engine core casing circumscribing the turbine may comprise selectively directing a flow of relatively hot, pressurized air in contact with the exterior surface of the engine core casing circumscribing the turbine when desired to expand the turbine shroud radially outward. The step of directing a flow of relatively hot, pressurized air in contact with an exterior surface of the engine core casing circumscribing the turbine may include impinging the flow of relatively hot, pressurized air directly against the exterior of the engine core casing circumscribing the turbine.

A method is also provided for controlling turbine blade tip seal clearance on a non-cowled gas turbine engine having an engine core casing, an outer casing circumscribing in radially spaced relationship the engine core casing, a fan air duct defined between the engine core casing and the outer casing, a compressor and a turbine, the turbine having a plurality of turbine blades circumscribed by a turbine shroud supporting a plurality of seals in juxtaposition with the tips of the plurality of turbine blades. The method of controlling turbine blade tip seal clearance includes the steps of: during operation of the gas turbine engine in a steady state mode, passing a relatively cool, low pressure air flow through the fan air duct in contact with an exterior surface of the engine core casing circumscribing the turbine; and during operation of the gas turbine engine in a transient mode, selectively passing a relatively hot, high pressure air flow in contact with the exterior surface of the engine core casing circumscribing the turbine. The step of selectively passing relatively hot, high pressure air in contact with the exterior surface of the engine core casing circumscribing the turbine during operation of the gas turbine engine in a transient mode may include displacing the flow of relatively cool, low pressure air away from contact with the exterior of the engine core casing circumscribing the turbine with the flow of relatively, high pressure air. Displacing the flow of relatively cool, low pressure air may include impinging the flow of relatively hot, high pressure air directly against the exterior of the engine core casing circumscribing the turbine.

In an embodiment, the flow of relatively hot, higher pressure air has a temperature exceeding a temperature of the flow of relatively cool, low pressure air by an amount in the range of about 232° C. to about 454° C. (about 450° F. to about 850° F.). The flow of relatively hot, high pressure air may be drawn from an airflow discharging from the compressor.

BRIEF DESCRIPTION OF THE DRAWINGS

For a further understanding of the disclosure, reference will be made to the following detailed description which is to be read in connection with the accompanying drawing, where.

DETAILED DESCRIPTION OF THE INVENTION

Figure 1:
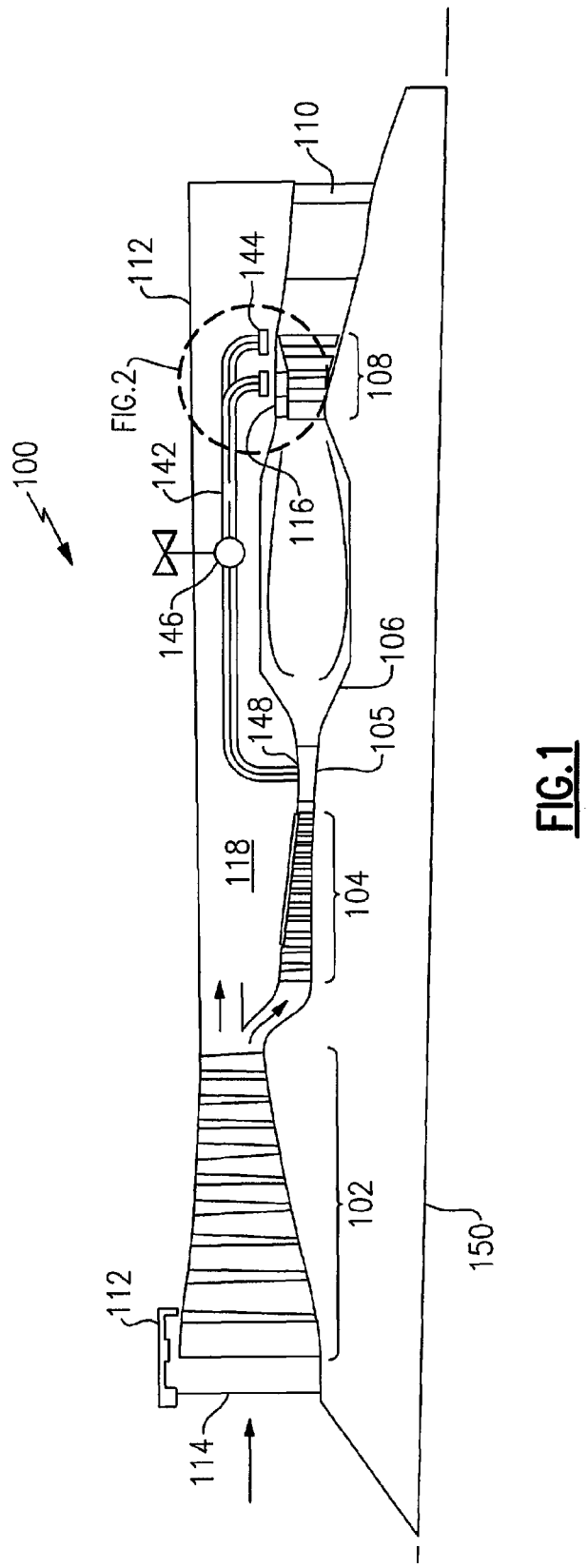
FIG. 1 is a schematic view of a longitudinal section of an exemplary embodiment of a non-cowled gas turbine engine equipped with a turbine tip seal clearance control system operative in accordance with the method disclosed herein.

There is depicted in FIG. 1 an exemplary embodiment of a non-cowled gas turbine aircraft engine, designated generally as 100, that is generally symmetric about a central engine axis 150. The gas turbine engine 100 may include, from fore-to-aft longitudinally about the central engine axis 150, a fan section 102, a compressor 104, a combustor module 106, a turbine 108, and an exhaust nozzle 110. An engine outer casing 112 circumscribes the fan 102 and defines an engine air inlet 114 at its forward end and extends aftward to provide an aerodynamic housing about gas turbine engine. The engine outer casing 112 circumscribes the engine core casing 116 and defines an annular fan air duct 118 between the engine core casing 116 and the engine outer casing 114.

Figure 2:
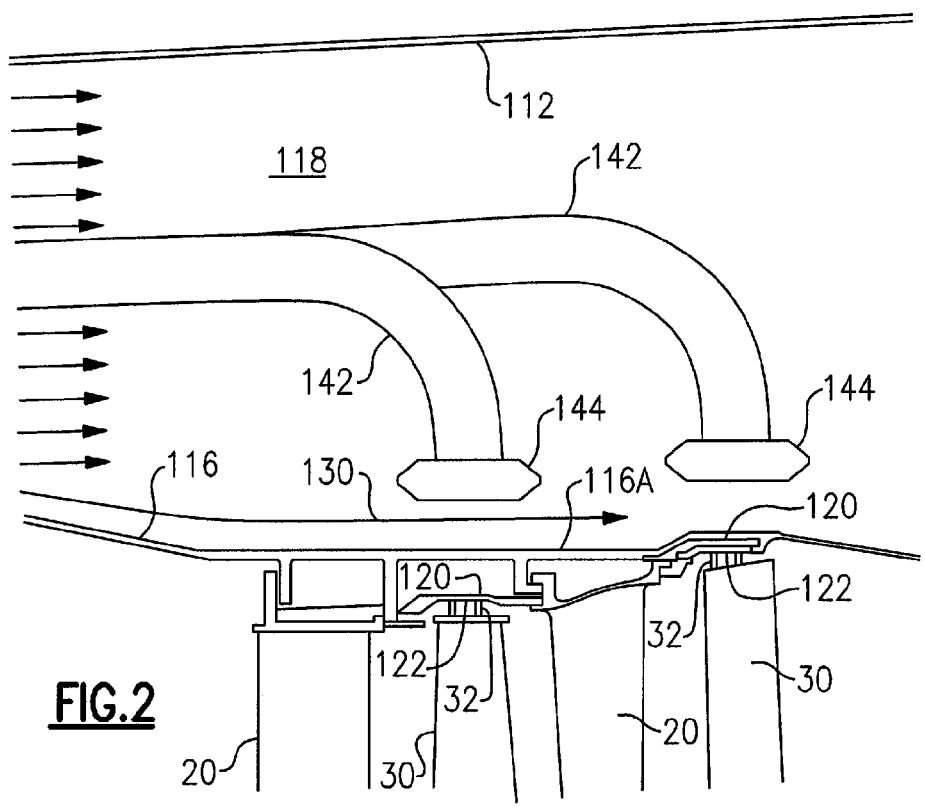
FIG. 2 is an elevation view, partly in section, of the section 2-2 of turbine tip seal clearance control system shown in FIG. 1.
Figure 3:
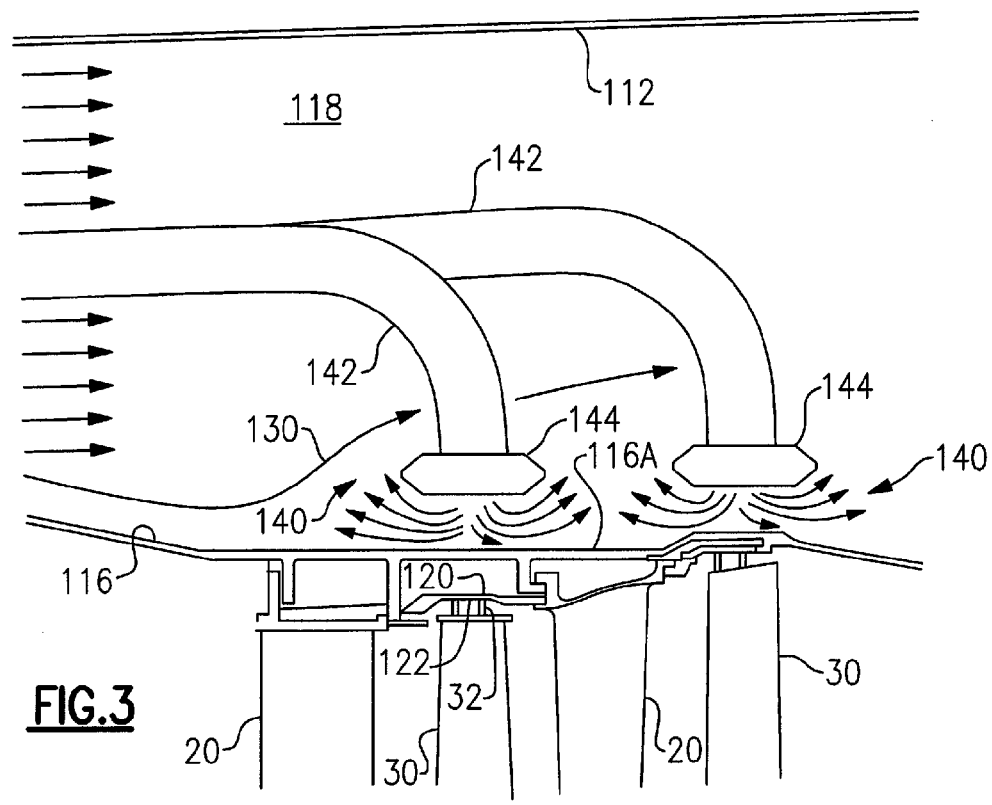
FIG. 3 is an elevation view as shown in FIG. 2 illustrating the turbine tip seal clearance control system in an activated state.

Referring now to FIGS. 2 and 3, the turbine 108 includes one or more turbine stages, each stage including a stator assembly and a rotor assembly. The stator assembly includes a plurality of circumferentially spaced stationary turbine vanes 20 extending generally radially between a stationary turbine shroud 120 and a stationary inner ring (not shown). The rotor assembly includes a plurality of circumferentially spaced turbine blades 30 extending generally radially outward from a rotatable disk (not shown). The tips of the turbine blades 30 are disposed in juxtaposition in close proximity to a facing surface of a blade tip seal 122 carried on the stationary turbine shroud 120. Sealing elements, such as for example knife edge elements 32 carried on the respective tips of the turbine blades 30, extend outwardly to contact the facing surface of the blade tip seal 122 to establish a sealing relationship. The turbine shroud 120 is supported from the engine core casing 116 in a conventional manner.

In operation of the gas turbine engine 100, ambient air is drawn into the air inlet 114 and through the fan section 102 by the rotating fan section 102. A portion of the relatively cool, low pressure fan air stream leaving the fan section 102 is ducted into the compressor 104 to be further pressurized. The relatively hot, high pressure air discharging from the compressor 104 passes through the diffuser section 105 to the combustor module 106. The remaining portion of the relatively cool, low pressure fan stream air leaving the fan section 102 enters the fan air duct 118 and passes through the fan air duct 118 to exit the gas turbine engine 100 about the exhaust nozzle 110.

In passing through the fan air duct 118, a flow 130 of the relatively cool, low pressure air flows along and in contact with the exterior surface of the engine core casing 116, as illustrated FIG. 2. The engine core casing 116, and therefore the turbine shroud 120 supported from the engine core casing 116, are cooled in part by the flow 130 of the relatively cool, low pressure air flowing along and in contact with the exterior surface of the engine core casing 116. Thus, in steady state operation of the gas turbine engine 100, for example during operation at cruise, the engine core casing 116 is maintained at a relatively constant temperature, and therefore maintains a relatively constant diameter. The stator assembly is designed such that the blade tip seals 122 carried on the turbine shroud 120 are in sealing relationship with a desired blade tip seal clearance, i.e. gap, relative to the tips of the turbine blades 30 when the gas turbine engine 100 is operating at steady-state.

However, during transient operation of the gas turbine engine 100, such as during acceleration of the gas turbine engine 100, such as for example during take-off, climb and rapid maneuvers wherein full engine power is required, the fuel flow to the combustor module 106 is increased significantly from steady-state fuel flow to produce the required engine power. As a result of the increased combustion of fuel in the combustor module 106, the temperature of the exhaust gases passing through the turbine 108 rises rapidly. Consequently, the temperature of the turbine blades 30, which are now exposed to higher temperature exhaust gases, increases, thereby causing the turbine blades 30 to grow radially outward. The surrounding turbine shroud 120 circumscribing the turbine blades 30 will also tend to expand as a result of the higher engine of the exhaust gases passing through the turbine 108, but radially outwardly at a much slower rate than the turbine blades 30.

Therefore, due to this relative differential expansion between the turbine blades 30 and the turbine shroud 120, the risk exists for the knife edge elements 32 carried on the respective tips of the turbine blades 30 to dig into, cut, abrade or otherwise damage and/or shorten the service life of the blade tip seals 122 carried on the turbine shroud 120. In conventional non-cowled gas turbine engines, the risk of blade tip seal damage due to lack of maintaining an appropriate blade tip seal clearance during transient operations of the gas turbine engine is exacerbated by the fact that the engine core casing 116, and indirectly the turbine shroud 120 supported from the engine core casing 116, is being directly cooled in part by the flow 130 of relatively cool, low pressure air passing along and in contact with the exterior surface of the engine core casing 116.

In accord with an aspect of the method disclosed herein, turbine blade tip seal clearance can be controlled on the non-cowled gas turbine engine 100 by directing a flow 140 of relatively hot, pressurized air in contact with an exterior surface of the section 116A of the engine core casing 116 circumscribing the turbine 108, as illustrated in FIG. 3. The flow 140 of relatively hot, pressurized air displaces the flow 130 of relatively cool, low pressure air further outwardly into the fan duct 118 away from the portion of the engine core casing 116 circumscribing the turbine 108. The flow 140 of relatively hot, pressurized air also flows along and in contact with the exterior surface of the engine core casing 116 circumscribing the turbine 108 before passing aft through the fan air duct 118 to exit the engine 100 with the fan air stream.

The flow 140 of relatively hot pressurized air heats the section 116A of the engine core casing 116 circumscribing the turbine 108 thereby causing the section 116A of the engine core casing 116 circumscribing the turbine 108 to expand diametrically outwardly. As a consequence, the turbine shroud 120 is also drawn diametrically outwardly as the engine core casing 116 circumscribing the turbine 108 expands. Therefore, the blade tip seals 122 carried on the turbine shroud 120 also move radially outwardly away from the respective tips of the turbine blades 30. By selectively directing the flow of relatively hot, pressurized air in contact with the exterior surface of the section 116A of the engine core casing circumscribing the turbine 108 when it is desired to expand the turbine shroud 120 radially outward, it is possible to control the blade tip seal clearance so as to maintain a desired clearance during transient operations of the gas turbine engine 100, such as during acceleration, take-off, climb and full power maneuvers.

In an aspect of the method disclosed herein, controlling turbine blade tip seal clearance includes during operation of the gas turbine engine 100 in a steady state mode, passing a flow 130 relatively cool, low pressure air flow through the fan air duct in contact with an exterior surface of the section 116A of the engine core casing circumscribing the turbine 108, and during operation of the gas turbine engine 100 in a transient mode, selectively passing a flow 140 of relatively hot, high pressure air flow in contact with the exterior surface of the section 116A of the engine core casing circumscribing the turbine 108. The flow 140 of relatively hot, high pressure air may be impinged against the exterior of the section 116A of the engine core casing circumscribing the turbine 108, for example as illustrated in FIG. 3, or otherwise contacted with the engine core casing 116 so as to displace the flow 130 of relatively cool, low pressure air away from contact with the exterior of section 116A of the engine core casing circumscribing the turbine 108.

The flow 140 of relatively hot, pressurized air constitutes high pressure air relative to the flow of relatively cool, low pressure air passing through the fan duct 118. The pressure of the flow 140 of relatively hot, pressurized air should be sufficiently high relative to the flow 130 of relatively cool, low pressure air so as to displace the flow 130 of relatively cool, low pressure air away from the section 116A of the engine core casing 116 circumscribing the turbine 108 and further into the fan duct 118. For example, the flow 140 of relatively hot, pressurized air may be drawn from the flow of high pressure air discharging from the compressor 104 or may be bled from an inter-stage location within the compressor 104. The temperature of the flow 140 of relatively hot, pressurized air should be high enough relative to the flow 130 of relatively cool, low pressure air to cause the engine core casing 116 circumscribing the turbine 108 to rapidly expand in response to the displacement of the flow 130 by the flow 140. By way of example, the flow of relatively hot, high pressure air may have a temperature exceeding a temperature of the flow of relatively cool, low pressure air by an amount in the range of about 232° C. to about 454° C. (about 450° F. to about 850° F.).

Referring now to FIGS. 1, 2 and 3, an exemplary embodiment of a system for carrying out the method disclosed herein includes a plurality of flow conduits 142, a plurality of discharge manifolds 144 and a flow control valve 146. Each of the conduits 142 has an inlet end 148 opening to the diffuser section 105 of the gas turbine engine to receive a flow of relatively hot, high pressure air discharging from the compressor 104. Each flow conduit 142 defines a flow path extending from the inlet end 148 to a discharge manifold 144.

The discharge manifolds 144 may be positioned in juxtaposition with the section 116A of the engine core casing 116 circumscribing the turbine 108 so as to directly impinge the flow 140 of relatively hot, pressurized air directly against the exterior surface of the section 116A of the engine core casing 116 circumscribing the turbine 108. It should be noted that although only two flow conduits 142 are depicted in FIGS. 1, 2 and 3 at a single location circumferentially, it is to be understood that additional flow conduits 142 with associated discharge manifolds 144 are provided at a number of circumferentially spaced locations about the circumference of the section 116A of engine core casing circumscribing the turbine 108 to ensure uniform expansion of section 116A of the engine core casing during activation of the method disclosed herein.

A flow control valve 146 is provided in operative association with each conduit 142 for selectively controlling the flow 140 of relatively hot, high pressure air through the conduit. The flow control valve 146 may be a simple two position, closed-open solenoid valve, a solenoid valve having one or more additional positions between a closed position, or a continuously variable flow control valve. The flow control valve 146 may be operatively associated with and its operation controlled by a master engine controller (not shown) for controlling operation of the gas turbine engine 100. The master engine controller may be programmed to selectively open each flow control valve 146 during periods of transient operation of the gas turbine engine, whereby each conduit 142 would be open to the flow 140 of relatively hot, higher pressure air.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiment(s) as illustrated in the drawing, it will be recognized by those skilled in the art that various modifications may be made without departing from the spirit and scope of the invention. Therefore, it is intended that the present disclosure not be limited to the particular embodiment disclosed as, but that the disclosure will include all embodiments falling within the scope of the appended claims.

We claim:

1. A method for controlling turbine blade tip seal clearance on a non-cowled gas turbine engine having a compressor, a turbine and an engine core casing, the turbine having a plurality of turbine blades circumscribed by a turbine shroud supporting a plurality of seals in juxtaposition with the tips of the plurality of turbine blades, the method of controlling turbine blade tip seal clearance comprising the step of:
   directing a flow of relatively cool, low pressure air in contact with and substantially parallel to an exterior surface of the engine core casing circumscribing the turbine; and
   directing a flow of relatively hot, pressurized air in contact with and orthogonal to the exterior surface of the engine core casing circumscribing the turbine to displace the flow of relatively cool, low pressure air away from contact with the exterior of the engine core casing.

2. The method as recited in claim 1 wherein the step of directing a flow of relatively hot, pressurized air in contact with an exterior surface of the engine core casing circumscribing the turbine comprises impinging the flow of relatively hot, pressurized air directly against the exterior of the engine core casing circumscribing the turbine.

3. The method as recited in claim 2 further comprising the step of drawing the relatively hot pressurized air from an airflow passing from the compressor.

4. The method as recited in claim 1 wherein the step of directing a flow of relatively hot, pressurized air in contact with an exterior surface of the engine core casing circumscribing the turbine comprises:

selectively directing a flow of relatively hot, pressurized air in contact with the exterior surface of the engine core casing circumscribing the turbine when desired to expand the turbine shroud radially outward.

5. A method for controlling turbine blade tip seal clearance on a non-cowled gas turbine engine having an engine core casing, an outer casing circumscribing in radially spaced relationship the engine core casing, a fan air duct defined between the engine core casing and the outer casing, a compressor and a turbine, the turbine having a plurality of turbine blades circumscribed by a turbine shroud supporting a plurality of seals in juxtaposition with the tips of the plurality of turbine blades, the method of controlling turbine blade tip seal clearance comprising the steps of:

during operation of the gas turbine engine in a steady state mode, passing a relatively cool, low pressure air flow through the fan air duct in contact with and substantially parallel to an exterior surface of the engine core casing circumscribing the turbine; and during operation of the gas turbine engine in a transient mode, selectively passing a relatively hot, high pressure air flow in contact with and orthogonal to the exterior surface of the engine core casing circumscribing the turbine to displace the relatively cool, low pressure air flow away from contact with the exterior of the engine core casing.

6. The method as recited in claim 5 wherein the step of selectively passing hot, high pressure air in contact with the exterior surface of the engine core casing circumscribing the turbine during operation of the gas turbine engine in a transient mode comprises displacing the flow of relatively cool, low pressure air further outwardly into the fan duct away from the engine core casing circumscribing the turbine with the flow of hot, high pressure air.

7. The method as recited in claim 6 wherein the flow of relatively hot, high pressure air has a temperature exceeding a temperature of the flow of relatively cool, low pressure air by an amount in the range of about 232° C. to about 454° C. (about 450° F. to about 850° F.).

8. The method as recited in claim 7 wherein the flow of relatively hot, high pressure air is drawn from an airflow discharging from the compressor.

9. The method as recited in claim 5 wherein the step of selectively passing hot, high pressure air in contact with the exterior surface of the engine core casing circumscribing the turbine during operation of the gas turbine engine in a transient mode comprises impinging the flow of relatively hot, high pressure air directly against the exterior of the engine core casing circumscribing the turbine.

10. The method as recited in claim 9 further comprising the step of drawing the flow of relatively hot, high pressure air from an airflow discharging from the compressor.

11. The method as recited in claim 10 wherein the flow of relatively hot, high pressure air has a temperature exceeding a temperature of the flow of relatively cool, lower pressure air by an amount in the range of about 232° C. to about 454° C. (about 450° F. to about 850° F.).

* * * * *